United States Patent [19]
Matthews, Jr. et al.

[11] 3,903,730
[45] Sept. 9, 1975

[54] METHOD OF LOCATING PIPELINE LEAKS WITH A ONE-WAY PIG

[75] Inventors: Jamie F. Matthews, Jr.; William M. McDonald, both of Houston, Tex.

[73] Assignee: Exxon Production Research Company, Houston, Tex.

[22] Filed: Nov. 5, 1973

[21] Appl. No.: 413,008

[52] U.S. Cl. .................... 73/40.5; 73/49.1; 138/90
[51] Int. Cl.² ......................................... G01M 3/08
[58] Field of Search ......... 73/40.5, 49.1, 49.8, 49.5; 138/89, 90, 93, 97

[56] References Cited
UNITED STATES PATENTS

| | | |
|---|---|---|
| 3,431,946 | 3/1969 | Sawyer.................... 73/40.5 R X |
| 3,561,490 | 2/1971 | Little........................ 73/49.1 X |
| 3,722,261 | 3/1973 | Milke........................ 73/40.5 R |

*Primary Examiner*—Donald O. Woodiel
*Assistant Examiner*—John S. Appleman
*Attorney, Agent, or Firm*—Lewis H. Eatherton

[57] ABSTRACT

A method of testing liquid-filled pipelines for leaks by introducing a one-way pigging device into one end of a pipeline and positioning the pigging device at successive locations along the length of the pipeline by hydraulic pressure applied at the same end of the pipeline. At each location, testing pressure is introduced from the opposite end of the pipeline thereby indicating the location of any leaks in the pipeline. The one-way pig moves in response to a pressure differential in one direction and becomes anchored at a location in response to a pressure differential in an opposite direction.

6 Claims, 4 Drawing Figures

PATENTED SEP 9 1975  3,903,730

METHOD OF LOCATING PIPELINE LEAKS WITH A ONE-WAY PIG

BACKGROUND OF THE INVENTION

1. Field of the Invention

This invention relates to a method for finding and locating breaks or leaks in an underwater pipeline and, more particularly, to such method which uses a one-way pigging apparatus which is moved by a pressure differential in one direction through a pipeline and which can be set or anchored in position by pressure differential applied in an opposite direction.

2. Description of the Prior Art

It is known that pigging devices can be passed through pipelines and used in the hydrostatic testing for leaks in the pipeline. Such a device is shown, for example, in U.S. Pat. No. 3,639,408. This particular pigging device is adapted for movement in either direction in response to the application of a pressure differential, but requires the application of pressure to both ends of the pipeline for the device to be anchored in a sealing position. The method using such device is disadvantageous since the use of pressure at both ends of the pipe can cause the device to shift prior to setting, and a misalignment with respect to the leak in the pipeline often occurs.

Another system is shown in U.S. Pat. No. 3,561,490, wherein a pigging device is moved by a pressure differential with a sudden increase in the applied pressure actuating an anchoring device in the pig. However, it will be appreciated that in this sort of apparatus the pressure for determing the leak is applied in the same direction as the pressure for moving the pipeline pig through the pipe. Also, if the apparatus fails to function or operate for some mechanical deficiency, there is no way to appropriately anchor the pig in the pipeline.

U.S. Pat. No. 3,690,348 illustrates a pig which can be moved in two directions. In this system, an anchoring valve is operated by a radio control for anchoring the pig in a pipeline. This system requires electronic equipment which increases the complexity and cost of the equipment.

Since none of these systems has been practical and effective for offshore pipelines and each of them involves a fairly sophisticated apparatus which is subject to malfunction and problems in the pipeline, the art has long sought a simple and practical solution to the problem of detecting leaks in pipelines.

SUMMARY OF THE INVENTION

The present invention solves the foregoing problems by providing a new method of detecting and locating pipeline leaks utilizing one-way pig means which is simple in construction and operation, and more reliable in locating the leak than heretofore possible. The improved method involves inserting a one-way pigging device into the end of a pipeline and transporting it to a first location in the pipeline by means of applied hydrostatic pressure. The volume of water introduced into the pipeline is metered so that the location of the pig in the pipeline can be calculated. When the pig is appropriately located, pressure is applied to the opposite end of the pipeline which sets or anchors the pig in position in the pipeline, and a continued application of a testing pressure will allow determination of whether there are any pressure drops indicative of a leak in the pipeline. Assuming a pressure drop is observed, indicating that a leak lies between the pig and the end of the pipeline at which the testing pressure is applied, the pressure is released and the pipeline pig again moved by the application of pressure from the first end to move the pig to its next location, which is again determined by metering the volume of water introduced. This operation is carried out, of course, until the pipeline pressure stays constant, which indicates that the pig passed the leak point in the pipeline in moving between the last two calculated locations. As can be seen, the accuracy of the leak location is dependent on the incremental lengths chosen for movement of the pig.

The one-way pig means useful in the method of this invention involves, in a first embodiment, a set of cup-type sealing members slidably supported on a body member. The body member includes a set of cup-shaped wedging members which are movable relative to the cup members to lock the cup members against the wall surface of the pipeline upon the application of pressure in a direction opposite to the direction of pig travel. A fluid bypass through the cup members is used to move the wedging members in the direction of pig travel, unlock the wedging members, and permit resumption of pig travel. In a second embodiment of a one-way pig means applicably employed in the method of the present invention, mechanical anchoring means on a body member are actuated by hydraulic pressure from the direction opposite that of pig travel.

Accordingly, it is a principal object of the present invention to provide a novel method for locating breaks or leaks in a pipeline, which method eliminates the disadvantages associated with previously proposed methods and provides a practical and effective means for the location of breaks or leaks.

It is a further object of the present invention to provide such novel method for detecting leaks in a pipeline in which a one-way pig means is transported to a location along the pipeline and a pressure differential applied to the pig in a direction opposite its movement to anchor the pig, the presence of a leak between the pig and location of the pressure differential application being determined by observing the absence or presence of a pressure drop.

A still further object of the present invention involves such novel method of detecting the location of leaks in a pipeline by successively testing lengths of pipe for leaks by movement of the pig along the pipeline with application of a pressure differential opposite the direction of movement upon anchoring of the pig, the detection of the leak being made by observing the presence or absence of a pressure drop.

Still further objects and advantages of the method of the present invention will become more apparent through the following more detailed description thereof.

DESCRIPTION OF THE PREFERRED EMBODIMENTS

Figure 1:
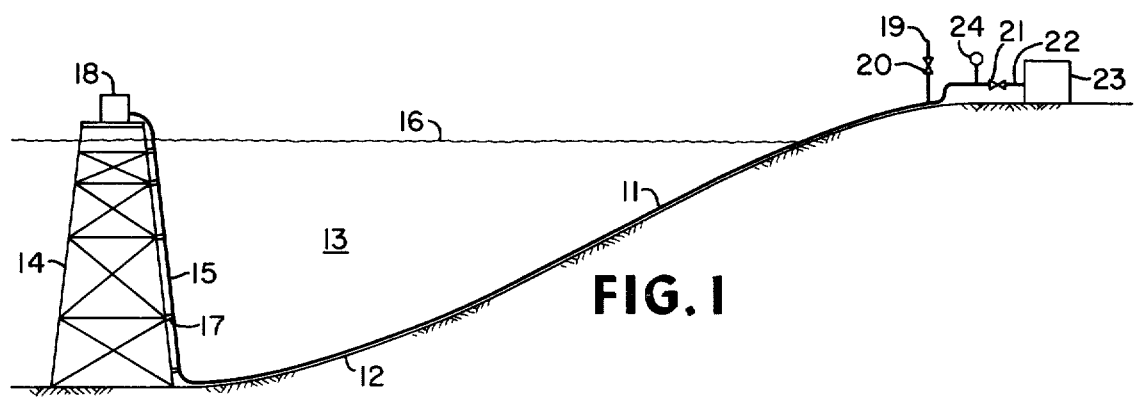
FIG. 1 of the drawings illustrates one embodiment of the use of the method of the invention in a pipeline disposed along an ocean floor.

FIG. 1 of the drawings depicts an offshore pipeline 11 which is disposed along the bottom 12 of a body of water 13 from an offshore platform 14 or similar structure. While FIG. 1 illustrates a pipeline disposed along the ocean floor, it should be readily apparent from the preceding and following description that the method of the present invention is applicable for pipelines on land and in fact is applicable for any and all conventional pipeline systems. In the particular installation shown, the end of pipeline adjacent the platform has been connected to the lower end of a pipeline riser 15 which extends upwardly to a point above the water surface 16 and is held in place on the platform by means of clamps or similar members 17. The type and configuration of the riser will depend upon the particular structure from which the pipeline has been laid and upon other factors. The method of the invention is also applicable to pipelines which are not connected to a riser, but instead extend from a shore installation or from a point on the bottom adjacent to an underwater well head or other underwater structure.

Figure 4:
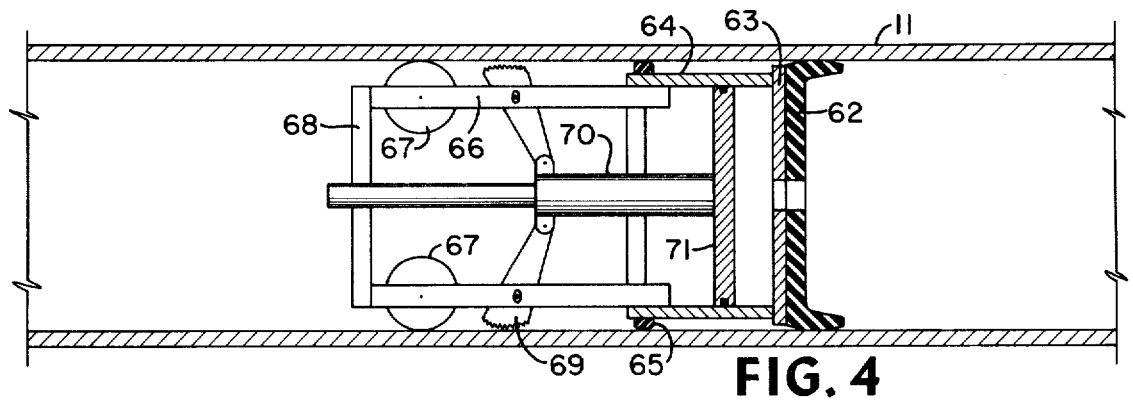

As shown in FIG. 1, a pump 18 is located on the platform 14. The pump takes suction from the sea by means of a suction line not shown. A one-way pig, as shown in FIG. 2 or FIG. 4 of the drawings, has been inserted into the pipeline at the platform deck level through a closure not shown.

Figure 2:
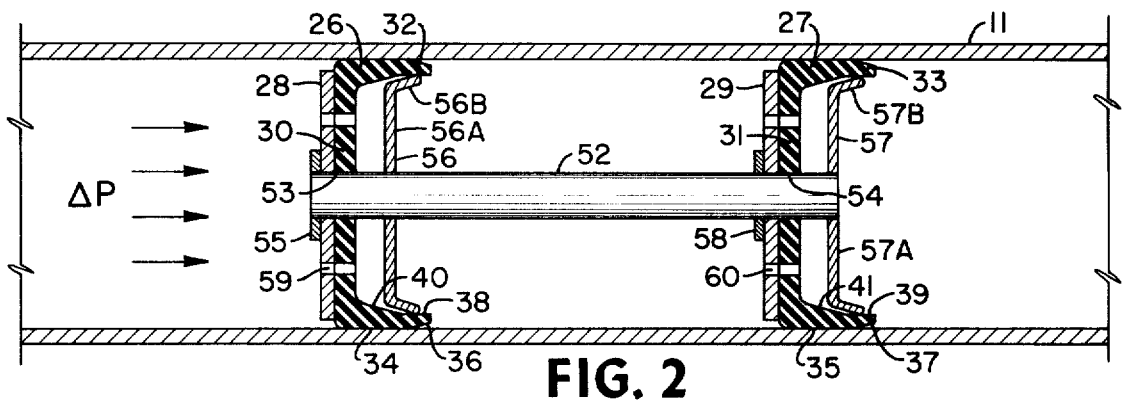
FIG. 2 indicates a pipeline pig in longitudinal cross section which is useful in the practice of the present invention and is illustrated in one condition of operation for movement through a pipeline.
Figure 3:
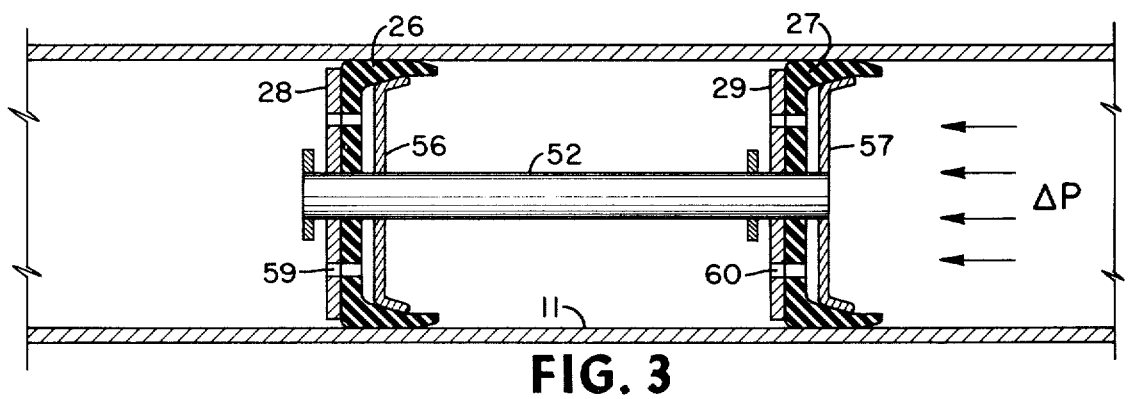
FIG. 3 is a cross section of the apparatus of FIG. 2 but illustrated in a condition where the pressure differential is in an opposite direction and the pipeline pig is in an anchored condition; and, FIG. 4 illustrates still another embodiment in longitudinal cross section of a pipeline pig which can be used in the operation of the present invention.

The embodiment of the pipeline pig means useful in the method of the present invention shown in FIGS. 2 and 3 includes a pair of annular disc-shaped or cup-type packing elements 26 and 27 which are longitudinally spaced from one another, attached to and supported by cylindrically shaped disc members 28 and 29. The disc members 28 and 29 are rigid and have a plate-like configuration and a diameter slightly less than the diameter of the pipeline 11 so that a disc member 28 and 29 provides a back-up support for the resilient packing elements or cups 26 and 27. The cups 26 and 27 are constructed from a resilient material and respectively have central portions 30 and 31 and outer lip-like portions 32 and 33 which taper from a center portion toward a narrower lip portion at a forward end. As illustrated, the outer surfaces 34 and 35 are cylindrically formed over the length of the portions 32 and 33 and have inwardly tapered wall sections 36 and 37. The inner walls of the lip portions 32 and 33 are generally cylindrically formed at the outer portions 38 and 39 and tapered at 40 and 41 to increase the wall thickness and provide a sealing surface.

The packing element assemblies have central bores 53 and 54 which are slidably mounted on a cylindrically shaped body member 52. The body or support member 52 is thus arranged for support along the central axis of a pipeline. At one end of the support member 52 are spaced apart members 55 and 56 including an end member 55 forming a flange and a first anchoring member 56. The first anchoring member 56 is a plate-like member having a dish-shaped configuration with a central, plate-like portion 56A of the anchoring member being disposed normal to the axis of the support member 52 and an outwardly tapering, flange-like portion 56B forming the periphery of the anchoring member. The flange-like portion 56B is arranged to have a taper complementary to the taper of the sealing element wall portion 40.

At the other end of the support member 52 are spaced-apart members 57 and 58 including a second anchoring member 57 at the end of the support member 52 and a flange member 58 disposed along the length of the support member 52. The second anchoring member 57 is formed and shaped similar to the first anchoring member 56. The spacing between members 55 and 56 is similar to the spacing between members 57 and 58.

The packing element assemblies each have bypass openings 59 and 60 through the plate and sealing members to permit fluid to bypass through disc members 28 and 29 and cups 26 and 27. In operation, as shown in FIG. 2, a differential pressure $\Delta P$ applied to the left side of the pig will cause it to travel in a direction toward the right. Fluid under pressure is applied to the plate 28 and can bypass the cups through openings 59 and 60. Thus, the pressure can be applied to the anchoring members 56 and 57. Although some fluid may bypass between the tapered flange portions 56B and 57B and the lips of the sealing elements, the amount will be negligible. In this mode, the fluid or liquid in front of the pig is being displaced through an outlet 19 as shown in FIG. 1. The volume of liquid applied to the back end of the pig is metered, and by calculation of volumes, the relative location of the pig in the pipeline can be determined.

When it is desired to set the pig, the motivating fluid drive from the platform pump 18 is discontinued. A valve (not shown) on the downstream side of the platform pump discharge is opened to permit a backflow. A valve 20 on the onshore outlet 19 is closed, and valve 21 on the onshore pump discharge 22 is opened. The onshore pump 23 is operated to supply fluid under pressure to the pig in the pipeline.

As shown in FIG. 3, the application of pressure in an opposite direction causes the anchoring members 57 and 56 to shift the body member 52 relative to the cup members 26 and 27 so that the tapered surfaces 56B and 57B engage the surfaces 40 and 41 and compress the sealing elements between the anchor members 56 and 57 and the wall of the pipeline 11. Thus, the pig is anchored to the pipeline by the wedging action of members 56 and 57 and a fluid-tight seal is effected. The application of the setting pressure is maintained and, if the pressure drops as indicated by gauge 24 in FIG. 1, this is an indication of a leak in the line between the pig and the onshore end of the line. This process is continued by advancing the pig shoreward in discrete intervals until the break or leak in the line is located. The break or leak is located when the gauge 24 shows no pressure drop, indicating that the leak lies somewhere within the last interval traversed by the pig.

Referring now to FIG. 4, an alternative embodiment of a one-way pig useful in the method of the present invention is illustrated. In this embodiment, a cup-type packing element 62 is attached to a back-up plate 63. The back-up plate 63 is attached to a tubular support 64 which carries an annular sealing ring 65 at its end. The sealing ring 65 engages the inner wall of the pipeline 11. In the open end of the support 64 are parallel sets of bars 66 (only two sets shown) with support wheels 67 at their ends and attached to one another by a plate member 68. It is convenient although not necessary to employ at least three equidistantly, angularly spaced sets of bars. Intermediate of the wheels 67 and the support 64 are pivoted anchor members 69 which are attached to a centrally located shift bar 70. The shift bar 70 is slidably mounted in an opening in the plate member 68 and attached to a piston member 71 disposed in the tubular cylinder 64. When pressure is applied across the pig means from left to right, the piston member 71 retracts the anchor members 69 and the pig is propelled to the right. When a fluid pressure differential is applied in an opposite direction, the piston 71 is moved to set the anchor members, which may be mechanical slips, into engagement with the wall of the pipeline and the pig is secured to and forms a fluid-tight seal with the pipeline.

The method of the present invention as previously described allows for the effective testing of pipelines, specifically liquid-filled pipelines, to determine the location of leaks therein. In this regard, by application of the method of the present invention it is possible to effectively determine the presence and location of leaks in a manner not heretofore possible with conventional techniques. The essential features of the present invention include the insertion of a one-way pig means as previously described into a pipeline with application of a first pressure differential to transport the pig to a first location along the pipeline so as to allow testing for leaks, the first pressure differential being discontinued when the pig arrives at the first location. The second pressure differential is applied to the pig in a direction opposite the first pressure differential so as to activate pressure responsive means to anchor the pig in the pipeline at the first location. The second pressure differential is maintained on the pig means for a sufficient period of time to determine the presence of a pipeline leak between the pig means and the source of the second pressure differential. This is effected by observing whether or not a pressure drop exists between the source of the second pressure differential and the pig means since a pressure drop will indicate a leak in that portion of the pipe. The absence of a pressure drop will, of course, indicate that the leak appears somewhere between the point of initial insertion of a one-way pig and the first location to which the one-way pig is transported.

If no pressure drop is observed and the location of the leak has been determined, the leak can be fixed in a conventional manner. The pig can be removed from the pipeline either before or after the repair is made by pumping it out.

If a pressure drop is observed, this indicates that the one-way pig has not yet traversed that portion of the pipeline where the leak is located. Accordingly, the second pressure differential is discontinued and a first pressure differential is again applied to disable the anchoring means of the pig and to transport the one-way pig a predetermined distance along the pipeline, this predetermined distance being that length of pipe which will not be tested for leaks. Accordingly, the distance which is traversed by the one-way pig in going from the first location to a second location displaced therefrom depends on the accuracy desired in locating the leak. On long lines it may be advantageous to run the pig twice—once to determine the approximate leak location and again for a more precise determination. When the one-way pig arrives at the second location the first pressure differential is discontinued and an opposite pressure differential is applied to activate the pressure responsive means anchoring the pig at the second location with the pressure differential being maintained for a sufficient period of time to determine the presence or absence of a pipeline leak in the length of pipe between the first location and second location. Again, this is accomplished by observing whether or not a pressure drop occurs since the absence of a pressure drop between the source of pressure and the one-way pig at the second location will indicate that a leak is present in that portion of the pipe traversed by the one-way pig in going from the first location to the second location. A pressure drop indicates that the one-way pig has not yet traversed the portion of the pipe where the leak is and in order to locate the leak, it is necessary to again repeat the steps of applying the first pressure differential to transport the one-way pig, discontinuing the first pressure differential, applying a second pressure differential to anchor the one-way pig and continuing the second pressure differential in order to determine the presence or absence of a pressure drop in that portion of the pipeline traversed by the one-way pig in going from the preceding location to its present location. Upon detection of the leak in this manner, the one-way pig will be removed from the pipeline in a conventional way, either before or after the leak is repaired.

It can be seen from the foregoing that through application of the one-way pig means in accordance with the present invention, a reliable and economical method of detecting the location of leaks or breaks in a pipeline is provided. It should be readily appreciated that the method described above eliminates all disadvantages of previously proposed methods thereby providing effective solution to the problem of leak detection.

While the present invention has been described primarily with regard to the foregoing exemplification, it should be understood that the method of the present invention cannot under any circumstances be deemed as limited thereby but rather must be construed as broadly as any or all equivalents thereof.

We claim:

1. A method for determining the presence of leaks in a pipeline which comprises inserting a pig means into a pipeline at a first location, said pig means being adapted to move in only one direction through said pipeline; pumping fluid into said pipeline, to move said pig means from said first location in said pipeline to a third location in said pipeline, discontinuing the pumping of fluid into said pipeline to position said pig means at said third location; passing fluid through said pipeline to create a pressure differential across said pig, wherein relatively low pressure is created in the pipeline between said first location and said pig and relatively high pressure is created in the pipeline portion between a said location and said pig, said pressure differential across said pig being sufficiently great to activate pressure responsive means in said pig means to anchor said pig means in said pipeline at said third location and to form a fluid-tight seal at said third location; maintaining said pressure differential across said pig and simultaneously metering the pressure in said high pressure portion of said pipeline for a pressure decline in said high pressure portion to determine the presence of a leak in said high pressure portion.

2. A method as defined in claim 2 further comprising passing fluid through said pipeline to eliminate the pressure differential across said pig to actuate pressure responsive means in said pig to disengage said anchoring means and to enable said pig to be pumped through said pipeline.

3. A method for determining the presence and location of leaks in a pipeline which comprises inserting a pig means into a pipeline at a first location, said pig means being adapted to move in only one direction through said pipeline; pumping fluid in said pipeline to move said pig means from said first location in said pipeline to a third location in said pipeline, discontinuing the pumping of fluid into said pipeline to position said pig means at said third location; passing fluid through said pipeline to create a pressure differential across said pig, wherein relatively low pressure is created in the pipeline between said first location and pig and relatively high pressure is created in the pipeline portion between said second location and said pig, said pressure differential across said pig being sufficiently great to activate pressure responsive means in said pig means to anchor said pig means in said pipeline at said third location and to form a fluid-tight seal at said third location; maintaining said pressure differential across said pig and simultaneously metering the pressure in said high pressure portion of said pipeline for a pressure decline in said high pressure portion to determine the presence of a leak in said high pressure portion; if a pressure decline is observed, pumping fluid into the said pipeline to eliminate the said pressure differential across said pig means to actuate pressure responsive means in said pig means to disengage said anchor in said pig means and to enable said pig means to be pumped to a fourth location in said pipeline between said third and second locations, said fourth location being displaced from said third location at a predetermined distance comprising the incremental length of pipeline to be tested for the presence of leaks, and discontinuing the pumping of fluid into the pipeline when said pig means is at said fourth location; passing further fluid through said pipeline to create a further pressure differential across said pig, wherein relatively low pressure is created in the pipeline between said first location and said pig and relatively high pressure is created in the further pipeline portion between said second location and said pig, said further pressure differential across said pig being sufficiently great to activate pressure responsive means in said pig means to anchor said pig means in said pipeline at said fourth location and to form a fluid-tight seal at said fourth location; maintaining said further pressure differential across the pig and simultaneously metering the pressure in said further high pressure portion of said pipeline for pressure decline in said further high pressure portion to determine the presence of a leak in said further high pressure portion; if a pressure decline is observed repeating the above steps to test successive lengths of pipeline for the presence of leaks; and if a pressure decline is not observed, withdrawing said pig means from said pipeline.

4. The method of claim 3 wherein the location of said pig means in said pipeline is determined by metering the amount of fluid pumped into said pipeline.

5. The method of claim 3 wherein any pipeline leaks determined to be present are repaired prior to withdrawal of said pig means from said pipeline.

6. The method of claim 3 wherein any pipeline leaks determined to be present are repaired after withdrawal of said pig means from said pipeline.

* * * * *